(No Model.) 4 Sheets—Sheet 2.
W. A. KONEMAN.
PROCESS OF AND APPARATUS FOR RECOVERING GOLD OR SILVER FROM REFRACTORY ORES.
No. 560,413. Patented May 19, 1896.
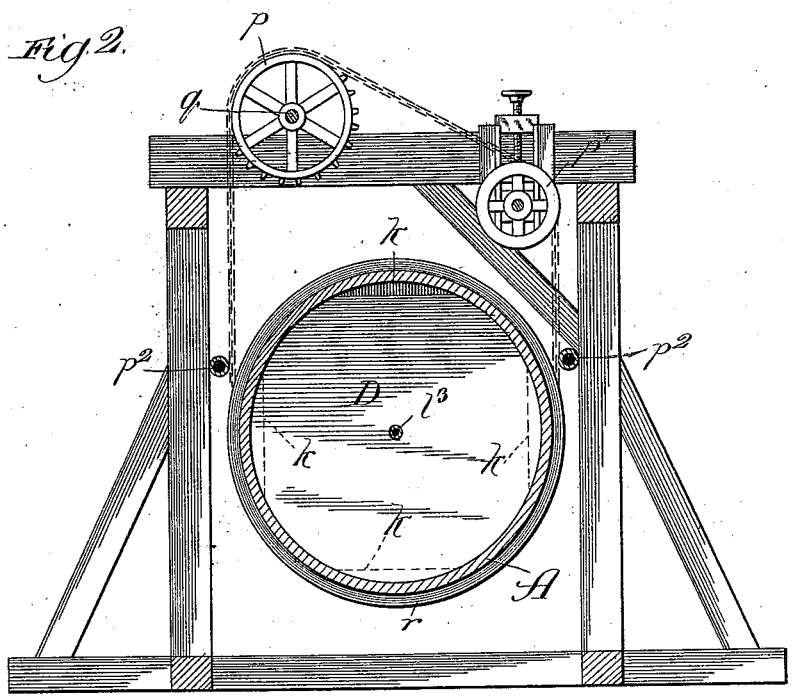
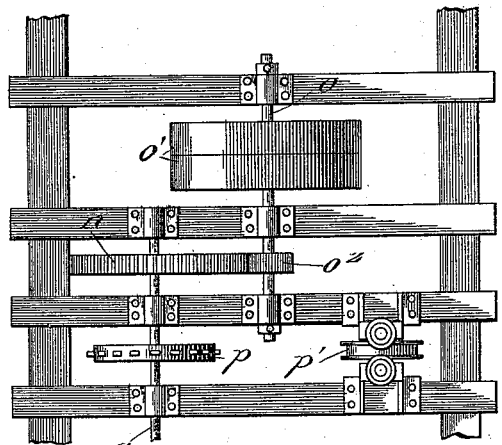
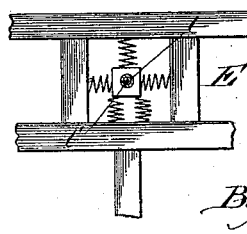
Witnesses:
Inventor:
William A. Koneman, (No Model.) 4 Sheets—Sheet 3.
W. A. KONEMAN.
PROCESS OF AND APPARATUS FOR RECOVERING GOLD OR SILVER FROM REFRACTORY ORES.
No. 560,413. Patented May 19, 1896.
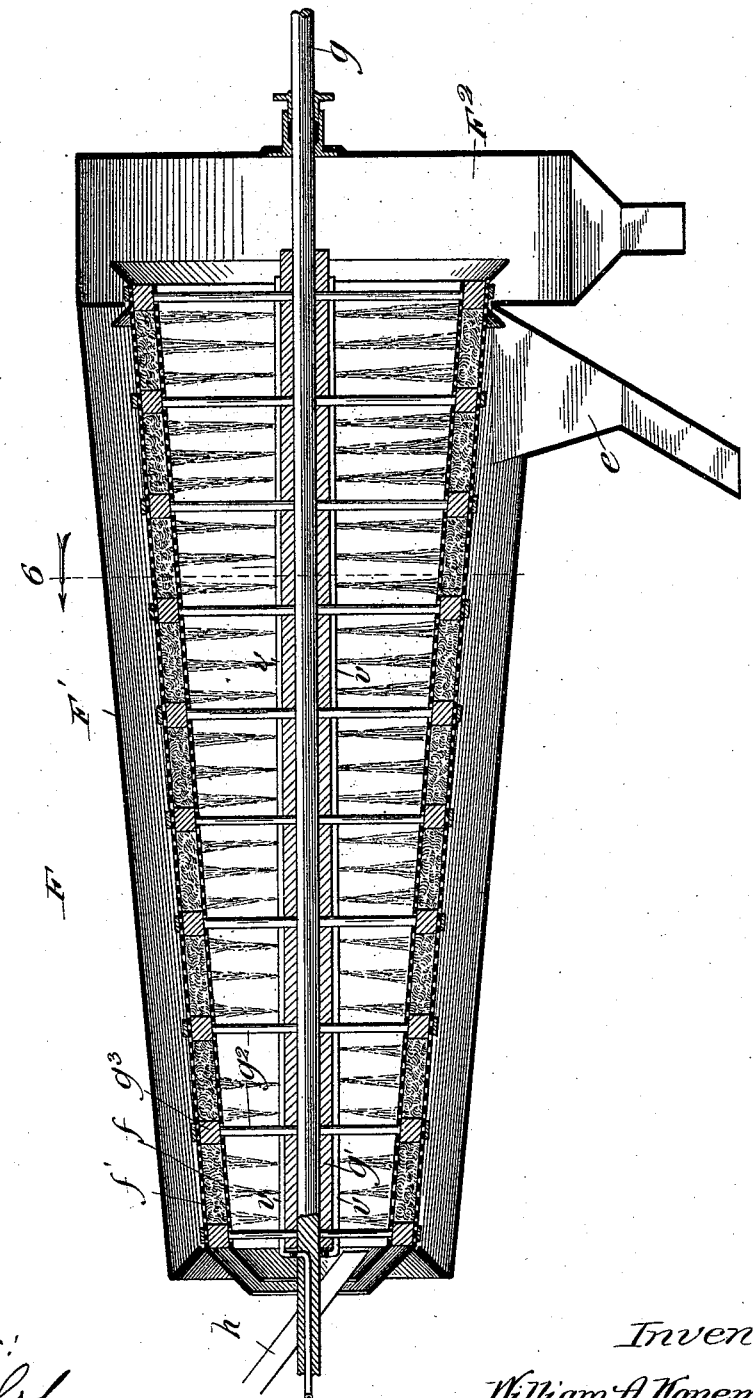

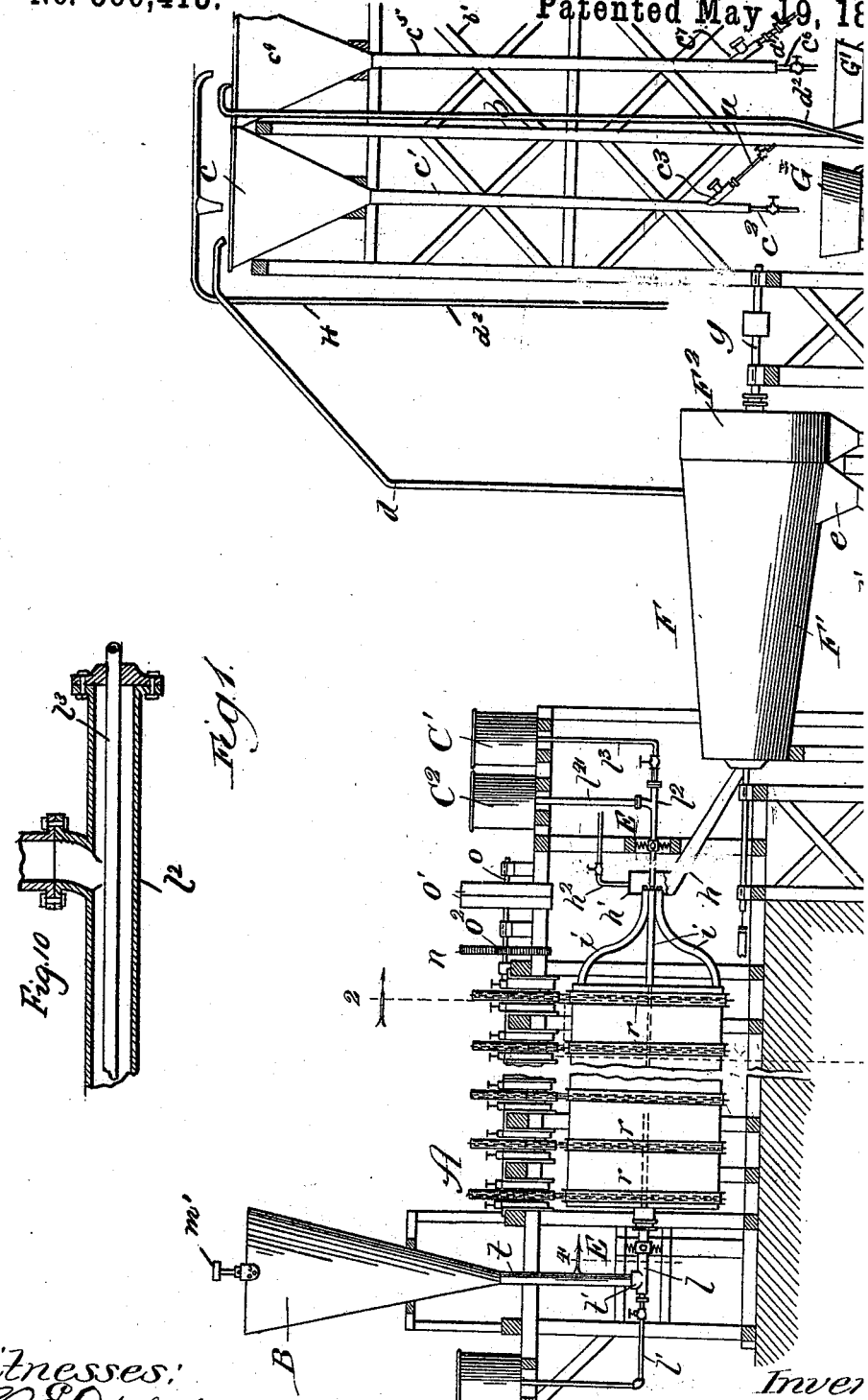

(No Model.) 4 Sheets—Sheet 4.
W. A. KONEMAN.
PROCESS OF AND APPARATUS FOR RECOVERING GOLD OR SILVER FROM REFRACTORY ORES.
No. 560,413. Patented May 19, 1896.
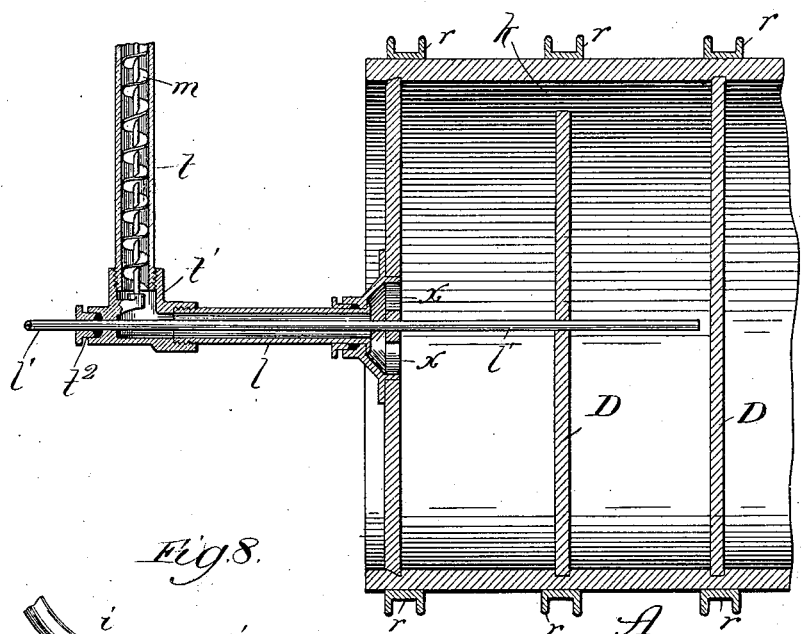
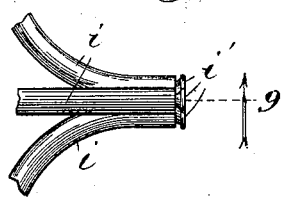
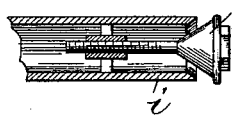
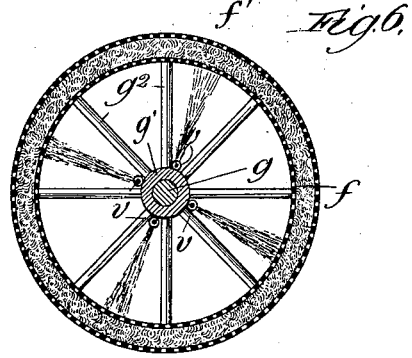
Witnesses:
Inventor:
William A. Koneman,
By Dyrenforth & Dyrenforth,
Attys.

UNITED STATES PATENT OFFICE.

WILLIAM A. KONEMAN, OF CHICAGO, ILLINOIS.

PROCESS OF AND APPARATUS FOR RECOVERING GOLD OR SILVER FROM REFRACTORY ORES.

SPECIFICATION forming part of Letters Patent No. 560,413, dated May 19, 1896.

Application filed May 8, 1894. Renewed October 24, 1895. Serial No. 566,784. (No model.)

*To all whom it may concern:*

Be it known that I, WILLIAM A. KONEMAN, a citizen of the United States, residing at Chicago, in the county of Cook and State of Illinois, have invented a new and useful Improvement in Processes of and Apparatus for Recovering Gold or Silver from Refractory Ores, of which the following is a specification.

My invention relates to the recovery of the precious metals from refractory ores by automatic lixiviation.

Several well-known processes known to me involve the provision of a stationary tank or revolving barrel, into which the pulverized ore and water are introduced and held under air, gas, or water pressure, and chlorid of lime and sulfuric acid or other reagents are added to generate the chlorin gas for dissolving the gold. From this tank the contents are discharged into a stationary filter in which water is added. The filter discharges the gold solution into a precipitation-tank, wherein sulfate of iron is added to precipitate the gold, which is taken out from time to time after sufficient time has been allowed for precipitation and melted into bullion; or, instead of the last-named tank, charcoal-filters are sometimes substituted, the charcoal is burned, and the gold, which is mixed with the residuary ash, is separated therefrom and thus recovered. This manner of procedure is objectionable by reason of the extensiveness of apparatus it necessitates, the large amount of labor it requires for main filtration, and the compartively small quantity of ore of which it enables treatment daily, all of which preclude the employment of this process to commercial advantage except where labor is very cheap.

The object of my improvement is to provide a process and apparatus for the chlorination or lixiviation treatment of refractory gold, or gold and silver ores, whereby a large tonnage of ore may be conveniently treated in twenty-four hours, whereby the chloridizing or lixiviating action on the precious metals shall be automatic and continuous, and the expense of apparatus and procedure shall be very much less than that attending the use of the old apparatus hereinbefore referred to.

Referring to the accompanying drawings, Figure 1 shows my improved apparatus by a broken and slightly sectional view in side elevation. Fig. 2 is a section of the same, taken at the line 2 2 on Fig. 1, viewed in the direction of the arrows and enlarged. Fig. 3 is a broken view showing the barrel-driving mechanism in plan. Fig. 4 is a section taken at the line 4 on Fig. 1 and viewed in the direction of the arrow and enlarged. Fig. 5 is an enlarged view of the filter in longitudinal sectional elevation. Fig. 6 is a section taken at the line 6 on Fig. 5, viewed in the direction of the arrow and reduced. Fig. 7 is an enlarged broken sectional view of the feed end of the barrel shown in Fig. 1. Fig. 8 is a view showing the discharge-pipes leading from the discharge end of the barrel. Fig. 9 is a section taken at the line 9 on Fig. 8, viewed in the direction of the arrow and enlarged; and Fig. 10 is an enlarged broken sectional view of certain pipes.

A is a barrel, which I prefer to form of wood suitably prepared to fill the pores and surrounded at intervals of, say, about two feet by hoops $r$, which should be grooved. I employ a barrel of great length, (say, for one hundred and twenty-five tons daily capacity, about sixty-five feet long and six feet in diameter,) which may be lined throughout with sheet-lead. The barrel is rotatably supported by suspension from sprocket-wheels $p$ on a shaft $q$, journaled above it, by chains $o$, passing around the sprocket-wheels and barrel-hoops $r$, and also over adjustable guide-pulleys $p'$ and between confining-guides $p^2$. (Represented in Fig. 2 as flanking the barrel and extending lengthwise thereof above its longitudinal center.) This construction and means of supporting the barrel enable me to employ it in the great length referred to and readily rotate it about its longitudinal axis without danger of straining the barrel. As the driving mechanism I show a shaft $o$ in Fig. 3, carrying a drive-pulley $o'$ and geared by a pinion $o^2$ to a cog-wheel $n$ on the shaft $q$.

At the inlet end of the barrel is supported a hopper-shaped feed stand-pipe B, which may be provided with an automatic disintegrator, preferably in the form of a rotary worm $m$, carrying a drive-pulley $m'$ at its upper projecting end, and which by its rotation prevents a clogging of the spout $t$. The spout $t$ enters at a coupling $t'$ a pipe I, coupled at one end with the adjacent head of the barrel, into which it opens, and at a stuffing-box $t^2$ in the outer end of the pipe $l$ there passes into and through the latter from a sulfuric-acid holder C, suitably supported in elevated position, a valve-controlled pipe $l'$, which extends into the barrel, say, about four feet and passes centrally through the first of a series of diaphragms D therein. These diaphragms, which are preferably formed of wood, should be provided at intervals apart corresponding with the hoops $r$ and have sectors cut away at or near successive quarters of their circumferences to afford openings $k$, forming what approximates a spiral passage through the barrel, since the chambers formed therein by the partitions communicate successively through openings at successive quarters of the partitions. The head at the discharge end of the barrel has four openings about its center, from which openings proceed lead pipes $i$, converging toward their outer ends and rotatably entering the closed head $h'$ of an inclined spout $h$, and in each pipe $i$ is seated, at its discharge end, a screw-plug $i'$, by which to regulate the discharge from the barrel and the pressure therein.

$C'$ and $C^2$ are respectively a sulfuric-acid-solution holder and a chlorid-of-lime-solution holder suitably supported in elevated position and having discharge-pipes $l^3$ and $l^4$. The pipe $l^4$ is united at its lower end with a pipe $l^2$, which extends horizontally through the adjacent barrel-head and through the partitions therein about to one-half the length of the barrel, and the pipe $l^3$, which is valve-controlled, passes through the pipe $l^2$ from its outer end and extends far into the barrel, say to the extent of about one-half the length of the latter.

To render the connection of the pipes $l$ and $l^2$ with the opposite ends of the barrel A adequately yielding, I provide them with spring-bearings E, of the construction most plainly illustrated in Fig. 4.

F is a conical filter, shown as formed with a stationary central shaft $g$, carrying hubs $g'$, from which proceed radially-extending spokes $g^2$, carrying heads $g^3$, the radial extent of the spokes on successive hubs increasing progressively, as shown, and the heads $g^3$ affording bearings for two concentric enveloping thicknesses $f$ and $f'$, of perforated sheet-lead, inclosed in a wooden or lead or lead-lined casing F', terminating at its flaring end in a chamber $F^2$, having a hopper-shaped outlet at its base and into which discharge the contents within the confines of the perforated circumferential sheets $f f'$, the space between which may contain filtering material, such as asbestos, and adjacent to the chamber $F^2$ a discharge-spout $e$ is provided in the bottom of the casing F' and leads to a sump or trough $e'$. Longitudinally-perforated lead pipes $v$ lead into the filter through the shaft $g$ and lie along the hubs $g$, between the spokes $g^2$, to conduct water into the filter from a water-pressure supply, (not shown,) with which the pipes have controllable communication.

A siphoning-pipe $d$, which may be operated by steam-pressure through a pipe $d'$, leads from the trough $e'$ upward and discharges into the mouth of a funnel $c$, supported in elevated position on a suitable frame $b$, and the stem $c'$ of which depends to extend over and discharge through a contracted valve-controlled pipe extension $c^2$ into a rapidly-rotating centrifugal filter G, which is like or substantially like the ordinary centrifugal drier employed for laundry purposes and is not therefore illustrated in detail in the drawings nor minutely described herein. Near the lower end of the funnel-stem $c'$ there enters an oblique branch $c^3$ thereof an injector-pipe $a$ for a purpose hereinafter described.

The operation for the extraction of gold from ores by means of chlorin gas is as follows: While the barrel A is revolving by driving the shaft $q$, the mixture of pulverized ore and water or pulp, which should be of about the consistency of quicksand, is fed with chlorid-of-lime solution to the hopper B, wherein it is subjected to agitation with a view to prevent clogging in the spout $t$ by the rotary action of the worm $m$, and the pulp enters the barrel from the pipe $l$ through openings $x$ in the head. Throughout the operation the barrel should be maintained full, or as nearly so as practicable, and the contents under adequate pressure, which is rendered possible by the height of the feed-pipe B, and a certain pressure of chlorin gas should be maintained in the barrel to cause it to thoroughly react upon the ore, the chlorin gas being generated by the chlorid-of-lime solution and that of the sulfuric acid which enters the barrel from the holder C through the pipe $l$, the charge of the chemicals introduced at the inlet end of the barrel being about one-half the quantity required for the entire treatment. The constant feed to and rotation of the barrel cause the pulp to course, as it were, spirally through the successive compartments formed by the partitions D by way of the openings $k$. When the pulp attains about to the longitudinal center of the barrel, it is met by the remainder of the supply of chlorinating-gas generated from the sulfuric-acid solution introduced at that point into the barrel through the pipe $l^3$ from the holder $C'$ and the chlorid-of-lime solution introduced therein to the same point from the holder $C^2$ through the pipes $l^4 l^2$. It may here be stated that this division of the dissolving medium, whereby about one half is applied to the ore in part of its course through the barrel, and the other half is added at the beginning of the remaining half of the course, is important by way of reinforcing, as it were, the dissolving action of the gas and producing a much more thorough dissolution of the gold than if the entire chlorinating charge were to be introduced initially with the ore.

The discharge of the contents of the barrel through the pipes into the spout $h$ (in the head $h'$ of which it should be further diluted with water from a valve-controlled pipe $h^2$) and thence into the filter F is controlled by regulating the plugs $i'$, which serve also to regulate the pressure inside the barrel. In the filter the pulp is further diluted with water sprayed into the filter through the perforated pipes $v$, and escapes, thoroughly exhausted of gold, into the chamber $F^2$, whence it may be taken or directed to a suitable apparatus (not shown) for further treatment by amalgamation or lixiviation to extract the contained silver and copper.

The liquor, which discharges from the filter-casing $F'$ into the trough $e'$, is directed by the steam-siphon $d'$ through the pipe $d$ into the upper end of the elevated funnel $c$, whence it flows down into the device G while the latter is revolving at a high rate of speed, say six hundred revolutions per minute; and in the contracted passage afforded by the stem $c'$ of the funnel the liquor is subjected in its downward course to the action of a reducing medium, injected through the pipe $a$, and which may be either a sulfate-of-iron solution, sulfurous acid, sulfureted hydrogen, hydrogen, or hydrocarbon, or a mixture of any two or more of these.

The action of the device G, which should contain at least two layers of filtering-cloth, is a filtering action, operating to catch the reduced gold by means of centrifugal filtration. The filter-cloth is periodically removed and the gold contents are dried and melted into bullion.

When gold and silver are to be simultaneously extracted, the ore is preparatorily roasted with a suitable preparation of salt to convert the silver into silver chlorid. The ore is then mixed with a saturated salt solution, instead of with water, as in the procedure hereinbefore described, but to produce about the same consistency of pulp, and the chlorin gas is generated in the same manner in the presence of the salt solution. The effect of this combination is that of dissolving the silver by the saturated salt solution, and the gold and copper ore dissolved by the generated chlorin gas, thus putting the gold, silver, and copper into solution. When the pulp discharges from the lixiviation-barrel and enters the cone-filter F, it is therein filtered by spraying through the pipes $v$, instead of water, saturated salt solution, the effect of which is to cause all the gold, silver, and copper to be caught in the sump $e'$. The further treatment according to this mode of treating gold and silver ore requires the provision of an additional reducing apparatus like and beside that involving the parts $c$ $c'$, &c., on the frame $b$, and the centrifugal filter G. In this secondary apparatus $b'$ is the frame; $c^4$, the funnel having the stem $c^5$ terminating in the extension $c^6$ and the oblique branch $c^7$, into which enters an injector-pipe $a'$. $G'$ is the centrifugal filter, and $e'$ is the sump.

The liquid contents of the sump $e'$, containing the three metals, are siphoned into the funnel $c$, and are therein diluted to the extent of about one-half with cold water, which may be led thereto by a hose H, and the effect of this dilution is to separate the chlorid of silver from the solution in the form of a white curd, as it is only held therein by the fully-concentrated condition of the salt solution. This chlorid-of-silver curd is caught in the first of the two centrifugal filters, and the liquor discharged from the latter then contains gold and copper, and is caught and siphoned through the secondary pipe $d^2$, referred to, into the secondary elevated funnel $c^4$, and falls through its stem $c^5$, wherein it meets the reducing agent introduced through the pipe $c^7$, and this liquor with its reduced gold contents enters the second filter $G'$ for separation of the gold. The liquor which discharges from the secondary filter $G'$ contains the copper, which may be precipitated and caught in a suitable stationary tank (not shown) containing scrap-iron.

Of course, and as will be readily understood, gold ores may be treated according to my improved process with cyanid solutions, and silver ores may be treated in the same manner with hyposulfid of soda or other solutions. The hyposulfid solution of soda may be one of from one-fourth per cent. to a five per cent. solution. I therefore do not limit my invention to any particular dissolving medium, as the operation remains practically the same whatever dissolving agents are employed.

What I claim as new, and desire to secure by Letters Patent, is—

1. The process of recovering precious metal from ore, which consists in continuously feeding the ore, in a pulpy condition, through a rotating barrel, subjecting the ore, in its course, to dissolution and continuously discharging the ore and solution from the barrel, substantially as described.

2. The process of recovering precious metal from ore, which consists in continuously feeding the ore, in a pulpy condition, under pressure through a rotating barrel, subjecting the ore, in its course, to dissolution and continuously discharging the ore and solution from the barrel, substantially as described.

3. The process of recovering precious metal from ore, which consists in continuously feeding the ore, in a pulpy condition, through a rotating barrel, subjecting the ore, at one or more points in its course, to a fresh charge of dissolving means, and continuously discharging the ore and solution from the barrel, substantially as described.

4. The process of recovering precious metal from ore, which consists in feeding the ore, in a pulpy condition, continuously and under pressure through a rotating barrel, introducing chlorin-gas-generating chemicals into said barrel near its feed end, and introducing additional chlorin-gas-generating chemicals into said barrel about midway of its length, substantially as described.

5. The process of recovering precious metals from ore, which consists in continuously feeding ore, in a pulpy condition, through a rotating barrel, subjecting the ore, in its course, to dissolution, filtering, continuously, the pulp and subjecting the liquor of filtration continuously to a chemical-reducing action, substantially as described.

6. The process of recovering precious metal from ore, which consists in continuously feeding ore, in a pulpy condition and under pressure, through a rotating barrel, subjecting the ore, in its course, to dissolution, filtering the pulp continuously and subjecting the liquor of filtration continuously to a chemical-reducing action and then to a second filtration, substantially as described.

7. The process of recovering gold and silver from ore, which consists in roasting the ore with salt, mixing the pulverized ore with a saturated salt solution to a pulpy consistency and continuously feeding it through a rotating barrel, and introducing into the ore, in its course through the barrel, a gold-dissolving agent, substantially as described.

8. The process of recovering gold and silver from ore, which consists in roasting the ore with salt, mixing the pulverized ore with a saturated salt solution to a pulpy consistency and continuously feeding it through a rotating barrel, introducing into the ore, in its course through the barrel, a gold-dissolving agent, and then subjecting the pulp to filtration and dilution with saturated salt solution, substantially as described.

9. The process of recovering gold and silver from ore, which consists in roasting the ore with salt, mixing the pulverized ore with a saturated salt solution to a pulpy consistency and feeding it through a rotating barrel, introducing into the ore, in its course through the barrel, a gold-dissolving agent, then subjecting the pulp to filtration and dilution with saturated salt solution, diluting the filtrate with water and filtering off the chlorid of silver thus set free in the solution, then subjecting the resultant filtrate to contact with a gold-reducing agent, and finally filtering off the reduced and precipitated gold, substantially as described.

10. In an apparatus for recovering precious metal from ore, an elongated drum rotatably supported and having an ore-pulp feed at one end and a discharge at its opposite end, partitions D at intervals in the drum and having openings $k$, and means for supplying a metal-dissolving medium to the ore in its course through the drum, substantially as described.

11. In an apparatus for recovering precious metal from ore, an elongated drum A containing partitions D provided with openings $k$, said drum being surrounded at intervals by bands $r$, a rotary shaft $q$ carrying sprocket-wheels from which the drum is suspended by chains passing about said bands, an ore-pulp feed and a discharge at opposite ends of the drum, and means for supplying a metal-dissolving medium to the ore in its course through the drum, substantially as described.

12. In an apparatus for recovering precious metal from ore, an elongated drum A containing partitions D provided with openings and rotatably supported, a feed B leading into one end of the drum, means communicating with said feed for introducing sulfuric acid into the feed end of the drum, discharge-pipes $i$ at the opposite end of the drum, and provided with plugs $i'$, and sulfuric-acid and chlorid-of-lime solution holders $C'$ and $C^2$ having discharge-pipes leading far into the drum from its discharge end, substantially as and for the purpose set forth.

13. In an apparatus for recovering precious metal from ore, a conical filter comprising a central shaft surrounded by perforated lead sheets flaring toward one end of the filter, between which a filtering mass is confined, spraying-pipes $v$ extending along the shaft inside the filter and an enveloping case $F'$ flaring toward one end and having outlets leading, respectively, from the case and from the interior of the filter, substantially as and for the purpose set forth.

14. In an apparatus for recovering precious metal from ore, the combination of an elongated drum A rotatably supported by suspension from a rotary shaft and having an ore-pulp feed at one end and a discharge at its opposite end, means for supplying a metal-dissolving medium to the contents of the drum, a filter F into which the drum discharges, a receptacle $e'$ for the filtrate, a siphon-pipe $d$ leading from said receptacle, an elevated funnel into which the pipe $d$ discharges and having an injector $a$ for a precipitating solution in its stem $c'$, and a filter G into which the funnel discharges, substantially as described.

WILLIAM A. KONEMAN.

In presence of—
M. J. FROST,
W. U. WILLIAMS.